No. 850,871. PATENTED APR. 16, 1907.
S. NAGASSE.
VEGETABLE PEELER AND SCRAPER.
APPLICATION FILED JUNE 12, 1906.
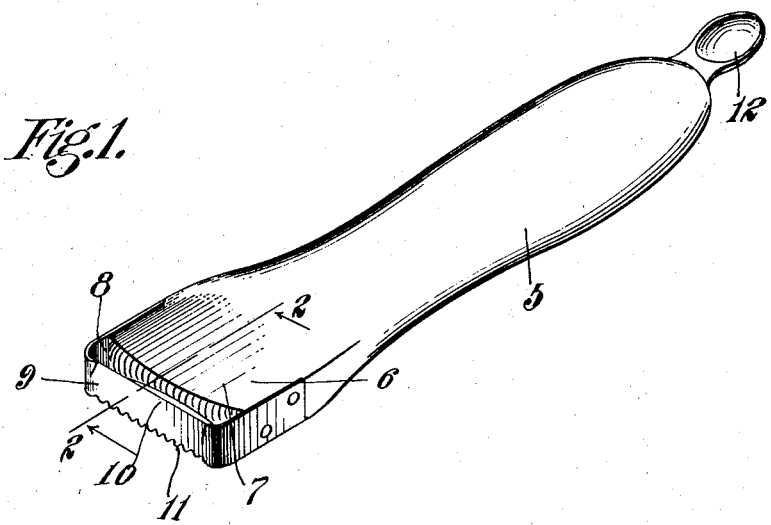
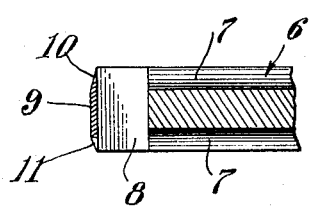

UNITED STATES PATENT OFFICE.

SOSAKU NAGASSE, OF LOS ANGELES, CALIFORNIA.

VEGETABLE PEELER AND SCRAPER.

No. 850,871.  Specification of Letters Patent.  Patented April 16, 1907.

Application filed June 12, 1906. Serial No. 321,410.

*To all whom it may concern:*

Be it known that I, SOSAKU NAGASSE, a subject of the Emperor of Japan, residing at Los Angeles, in the county of Los Angeles and State of California, have invented new and useful Improvements in Vegetable Peelers and Scrapers, of which the following is a specification.

My invention relates to an improved instrument for paring, scraping, or peeling fruit, vegetables, and the like and removing all defects that may exist therefrom; and the object of my invention is to provide a device that is simple in construction and embodying economy in manufacture. I accomplish this object by means of the device described herein and illustrated in the accompanying drawings, in which—

Figure 1 is a perspective view of my improved peeler and scraper. Fig. 2 is a section taken on line 2 2 of Fig. 1 looking in the direction indicated by the arrows.

Referring to the drawings, 5 indicates a handle, preferably of wood, of any suitable configuration, which terminates at its outer end in a rectangular head 6, which is hollowed out on both sides, as at 7. Suitably secured to this rectangular head and at a suitable distance therefrom, so as to form a slot 8, is the double-edged cutter or scraper-knife 9, one edge of which is beveled to form a knife-blade 10, and the other edge is composed of a number of serrations 11, which constitutes the scraper edge. These serrations on the scraper edge may be of any desired shape or form. Secured to the inner end of the handle 5 is a spoon 12 for removing the undesirable portions of the fruit or vegetable.

In the use of my device the blade 10 is adapted for ordinary paring or peeling of fruit or vegetables, while the other edge, having the serrations thereon, is adapted to prepare vegetables that have ordinarily very thin skins, such as carrots, new potatoes, radishes, and other like vegetables.

It will be seen from the foregoing description that I have produced a device that is remarkably cheap in construction and efficient in operation and which practically combines two instruments in one—namely, a peeler and a scraper.

Having described my invention, what I claim as new, and desire to secure by Letters Patent of the United States, is—

As an article of manufacture, a vegetable parer and scraper comprising a handle, one end of which has its opposite sides concaved, and an approximately straight knife secured at its ends to the opposite edges of the handle so that some space intervenes between it and the end of the handle, one edge of the knife beveled or sharpened and the other edge serrated, and the width of the knife greater than the thickness of the concaved portion of the handle.

In witness that I claim the foregoing I have hereunto subscribed my name this 6th day of June, 1906.

SOSAKU NAGASSE.

Witnesses:
EDMUND A. STRAUSE,
G. E. HARPHAM.